US012578545B2

(12) United States Patent
Son

(10) Patent No.: US 12,578,545 B2
(45) Date of Patent: Mar. 17, 2026

(54) CAMERA MODULE

(71) Applicant: SAMSUNG ELECTRO-MECHANICS CO., LTD., Suwon-si (KR)

(72) Inventor: Joung Ho Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1004 days.

(21) Appl. No.: 17/474,354

(22) Filed: Sep. 14, 2021

(65) Prior Publication Data

US 2022/0214520 A1 Jul. 7, 2022

(30) Foreign Application Priority Data

Jan. 7, 2021 (KR) ........................ 10-2021-0001915

(51) Int. Cl.
| | |
|---|---|
| *G02B 7/18* | (2021.01) |
| *G02B 7/09* | (2021.01) |
| *G02B 13/00* | (2006.01) |
| *H04N 5/225* | (2006.01) |
| *H04N 23/55* | (2023.01) |
| *H04N 23/57* | (2023.01) |

(52) U.S. Cl.
CPC ............. *G02B 7/1805* (2013.01); *G02B 7/09* (2013.01); *G02B 13/0065* (2013.01); *H04N 23/55* (2023.01); *H04N 23/57* (2023.01)

(58) Field of Classification Search
CPC .......... G02B 7/08; G02B 7/09; G02B 7/1805; G02B 13/0065; G02B 27/646; H04N 23/54; H04N 23/55; H04N 23/57; H04N 23/687; G03B 17/17

USPC ................................................ 359/831, 223.1
See application file for complete search history.

(56) References Cited

U.S. PATENT DOCUMENTS

| | | | | |
|---|---|---|---|---|
| 10,048,507 | B2 * | 8/2018 | Nomura | ................. G02B 7/102 |
| 10,334,146 | B2 | 6/2019 | Im et al. | |
| 2014/0362242 | A1 | 12/2014 | Takizawa | |
| 2018/0367714 | A1 | 12/2018 | Im et al. | |
| 2019/0235202 | A1 * | 8/2019 | Smyth | .................... H04N 23/57 |

(Continued)

FOREIGN PATENT DOCUMENTS

| | | |
|---|---|---|
| CN | 1497331 A | 5/2004 |
| CN | 109143528 A | 1/2019 |

(Continued)

OTHER PUBLICATIONS

Korean Office Action issued on May 1, 2022, in counterpart Korean Patent Application No. 10- 2021-0001915 (6 Pages in English, 5 Pages in Korean).

(Continued)

*Primary Examiner* — Marin Pichler
(74) *Attorney, Agent, or Firm* — NSIP Law

(57) ABSTRACT

A camera module includes: a first lens module disposed in a housing and including at least one lens; a reflective member configured to change a path of light toward the first lens module; an extension member configured to be moved together with the reflective member, and disposed between the reflective member and the first lens module; and a shake compensation actuator disposed in the extension member and configured to tilt the reflective member with respect to an axis perpendicular to an optical axis of the first lens module.

28 Claims, 11 Drawing Sheets

(56) References Cited

U.S. PATENT DOCUMENTS

| | | | | |
|---|---|---|---|---|
| 2020/0301160 A1* | 9/2020 | Fujisaki | ................. | G03B 30/00 |
| 2020/0341290 A1* | 10/2020 | Chan | .................... | H04N 23/687 |
| 2021/0208363 A1 | 7/2021 | Kuo et al. | | |
| 2021/0397017 A1* | 12/2021 | Jeong | ........................ | G03B 5/00 |
| 2022/0210296 A1* | 6/2022 | Bang | ................. | H04N 23/6812 |
| 2022/0342276 A1* | 10/2022 | Min | ........................ | H04N 23/55 |
| 2022/0404683 A1* | 12/2022 | Lee | .......................... | G03B 5/06 |
| 2023/0171475 A1* | 6/2023 | Jang | ........................ | H04N 23/54 |
| | | | | 348/373 |
| 2023/0269453 A1* | 8/2023 | Lee | ........................ | G03B 30/00 |
| | | | | 348/207.99 |

FOREIGN PATENT DOCUMENTS

| | | | |
|---|---|---|---|
| CN | 111367036 A | 7/2020 |
| JP | 2017-207548 A | 11/2017 |
| KR | 10-2018-0137277 A | 12/2018 |
| KR | 10-2067069 B1 | 1/2020 |
| KR | 10-2021-0000069 A | 1/2021 |
| WO | WO 2020/262876 A1 | 12/2020 |

OTHER PUBLICATIONS

Chinese Office Action Issued on Mar. 27, 2024, in Counterpart Chinese Patent Application No. 202111384760.3 (3 Pages in English, 5 Pages in Chinese).

Examination Report issued on Jul. 20, 2022, in counterpart Indian Patent Application No. 202114041294 (5 Pages including English).

* cited by examiner

CAMERA MODULE

CROSS-REFERENCE TO RELATED APPLICATIONS

This application claims the benefit under 35 U.S.C. § 119(a) of Korean Patent Application No. 10-2021-0001915 filed on Jan. 7, 2021 in the Korean Intellectual Property Office, the entire disclosure of which is incorporated herein by reference for all purposes.

BACKGROUND

1. Field

The following description relates to a camera module and, more particularly, to a technology regarding a driving unit for stabilizing an optical image.

2. Description of Related Art

Camera modules provided in mobile devices have been manufactured to have levels of performance comparable to those of traditional cameras. In particular, as the frequency of capturing images using mobile devices increases, demand for camera modules capable of providing high zoom magnification has increased.

In order to increase zoom magnification, a distance for light incident in a camera to move to an image sensor, that is, a total track length (TTL), has to be increased. In order to provide a relatively long total track length, a length of the camera may be increased. Folded cameras have been configured with a relatively long total track length obtained by switching light coming from the rear of a mobile device by about 90 degrees using a reflector such as a prism.

In general, a camera module includes a lens barrel including a lens disposed therein, and a housing accommodating the lens barrel therein. The camera module also includes an image sensor configured to convert an image of a subject into an electrical signal. Short focus camera modules configured to image objects with a fixed focus have been used. However, recently, camera modules including an actuator enabling autofocusing have been adopted, in line with technical developments. In addition, camera modules employ an actuator for optical image stabilization (OIS) to reduce a degradation of resolution due to camera shake.

Optical image stabilization may be implemented by tilting a prism in a folded camera. For example, the prism may be tilted using electromagnetic interaction between a magnet fixedly disposed in the prism and a coil disposed to oppose the magnet, and, accordingly, a direction of light reflected from the prism may be adjusted. However, since a shake compensation driving unit (the magnet or the coil) cannot be disposed on a path of light passing through the prism, an arrangement position of the driving unit is limited. For example, in a shake compensation driving unit for tilting a prism extending in a length direction on two axes, a pair of magnets for uniaxial tilt may be symmetrically arranged at both ends of the prism in the length direction, but a magnet for the other uniaxial tilt cannot be arranged symmetrically. Therefore, shake compensation performance may be deteriorated due to the asymmetrically arranged shake compensation driving unit.

For high zoom magnification, it is necessary to increase a distance by which light travels from the prism to the image sensor. As the distance increases, the degree of fluctuation of an image formed on the image sensor increases according to a tilt of the prism. Accordingly, it is more important to accurately control the prism in high zoom magnification.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a first lens module disposed in a housing and including at least one lens; a reflective member configured to change a path of light toward the first lens module; an extension member configured to be moved together with the reflective member, and disposed between the reflective member and the first lens module; and a shake compensation actuator disposed in the extension member and configured to tilt the reflective member with respect to an axis perpendicular to an optical axis of the first lens module.

The shake compensation actuator may include: magnets disposed on a surface of the extension member parallel to the optical axis; and coils facing the magnets.

The magnets may include a first pair of magnets fixedly disposed in the extension member and facing each other in a first direction perpendicular to the optical axis. The coils may include a first pair of coils fixedly disposed in the housing and facing the first pair of magnets.

The magnets may include a second pair of magnets fixedly disposed in the extension member and facing each other in a second direction perpendicular to both the optical axis and the first direction. The coils may include a second pair of coils fixedly disposed in the housing and facing the second pair of magnets, respectively.

The camera module may further include: a pair of position sensors arranged in positions respectively corresponding to magnets configuring the first pair of magnets. The reflective member may include a reflective surface configured to change a direction of the light, and a tilt axis of the reflective member is parallel to the reflective surface.

The extension member may include a transparent material and allow light reflected from the reflective member to pass through the extension member.

The extension member may include a through portion allowing light reflected from the reflective member to pass through the extension member.

The camera module may further include a holder accommodating the reflective member. The extension member may extend from the holder toward the first lens module.

The camera module may further include at least one additional lens disposed in the extension member.

The camera module may further include a second lens module spaced apart from the first lens module in a direction of the optical axis.

The camera module may further include an actuator configured to independently move the first lens module and the second lens module in the direction of the optical axis.

The camera module may further include a ball member disposed between the reflective member and the housing. The reflective member may be configured to tilt with respect to the axis perpendicular to the optical axis, in a state of being supported by the ball member in the housing in a direction parallel to the optical axis.

The camera module may further include: a first magnetic member coupled to the reflective member; and a second magnetic member fixedly disposed in the housing and facing the first magnetic member. The ball member may support the reflective member in the direction parallel to the optical axis by magnetic attraction generated between the first magnetic member and the second magnetic member.

In another general aspect, a camera module includes: a lens module disposed in a housing and including at least one lens; a reflective assembly configured to reflect light, which is incident in a first direction, toward the lens module; and a shake compensation actuator configured to tilt the reflective assembly with respect to an axis perpendicular to both the first direction and an optical axis of the lens module. The shake compensation actuator includes a pair of magnets fixedly disposed in the reflective assembly and facing each other in the first direction, and a pair of coils fixedly disposed in the housing and facing the pair of magnets.

The reflective assembly may include a reflective member configured to reflect the light, and a structure fixedly coupled to the reflective member and having the pair of magnets mounted in the structure.

In another general aspect, a shake compensation reflective module includes: a housing; a reflective member disposed in the housing and allowing incident light to be changed in path and exit the reflective member; an extension member configured to move together with the reflective member and extending in a direction in which light changed in path exits the reflective member; and a shake compensation actuator disposed in the extension member and enabling the reflective member to be tilted with respect to an axis perpendicular to the direction in which the light exits the reflective member.

The extension member may include an open space through which the light changed in path is allowed to pass after exiting the reflective member.

The extension member may be formed of a transparent material.

The shake compensation reflective module may further include at least one additional lens disposed within the open space.

The shake compensation actuator may include a first magnet and a second magnet respectively disposed in sides of the reflective member that are spaced apart from each other in a first direction perpendicular to the direction in which the light changed in path exits the reflective member.

The shake compensation actuator may include a third magnet and a fourth magnet respectively disposed in sides of the reflective member that are spaced apart from each other in a second direction perpendicular to the first direction and the direction in which the light changed in path exits the reflective member.

The incident light may be incident to the reflective member in a direction perpendicular to the direction in which the light changed in path exits the reflective member.

In another general aspect, a portable electronic device includes a camera module including: a lens module disposed in a housing and including at least one lens; a reflective member configured to change a path of light incident to the reflective member toward the lens module; an extension member configured to be moved together with the reflective member, and extended from the reflective member; and a shake compensation actuator disposed in the extension member and configured to tilt the reflective member.

The optical axis may extend perpendicular to a direction from a front surface of the portable electronic device to a rear surface of the portable electronic device.

The extension member may include an open space through which the light is allowed to pass after passing the reflective member.

The extension member may be formed of a transparent material.

The extension member may be disposed between the reflective member and the lens module.

The shake compensation actuator may be further configured to tilt the reflective member with respect to an axis perpendicular to an optical axis of the lens module.

The extension member may be extended toward the lens module.

Other features and aspects will be apparent from the following detailed description, the drawings, and the claims.

Figure 1:
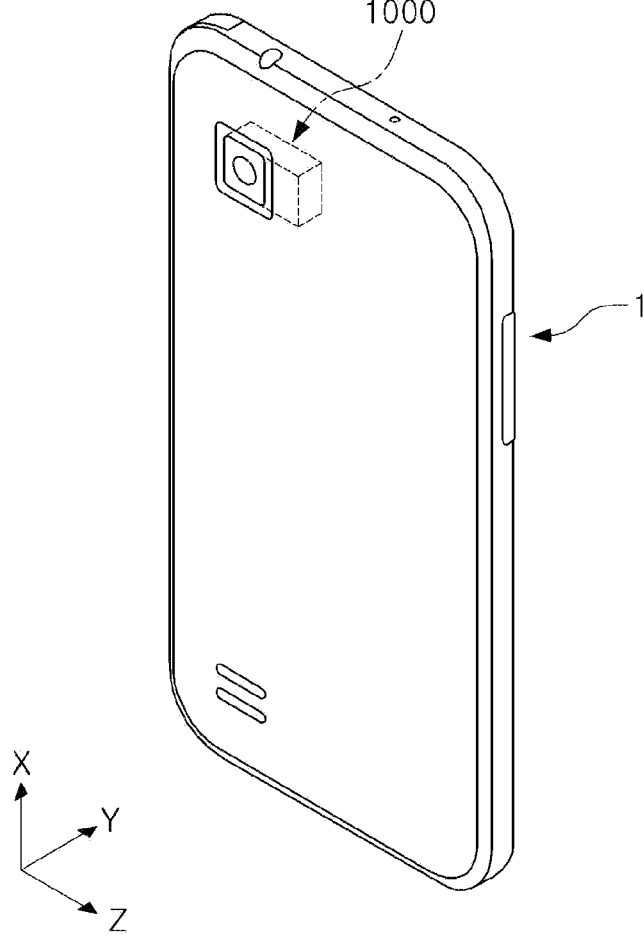
FIG. 1 is a perspective view of a portable electronic device, according to an embodiment.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after an understanding of this disclosure. Further, although the examples described herein have a variety of configurations, other configurations are possible as will be apparent after an understanding of this disclosure.

FIG. 1 is a perspective view of a portable electronic device, according to an embodiment.

Referring to FIG. 1, a portable electronic device 1 may be a portable electronic device such as a mobile communication terminal, a smartphone, or a tablet PC equipped with a camera module 1000.

As shown in FIG. 1, the portable electronic device 1 is equipped with the camera module 1000 to image a subject. The camera module 1000 may include a plurality of lenses, and an optical axis (a Z-axis) of the lenses may face in a direction perpendicular to a thickness direction (a Y-axis direction, or a direction from a front surface to a rear surface of the portable electronic device 1 or the opposite direction) of the portable electronic device 1.

For example, the optical axis (the Z-axis) of the lenses disposed in the camera module 1000 may be formed in a width direction or a length direction of the portable electronic device 1 (Z-axis direction or X-axis direction). Therefore, even if the camera module 1000 has functions such as autofocusing (AF), zoom, and/or optical image stabilization (01S) (or shake compensation), the thickness of the portable electronic device 1 may not increase. Accordingly, the portable electronic device 1 may be compact.

Figure 2:
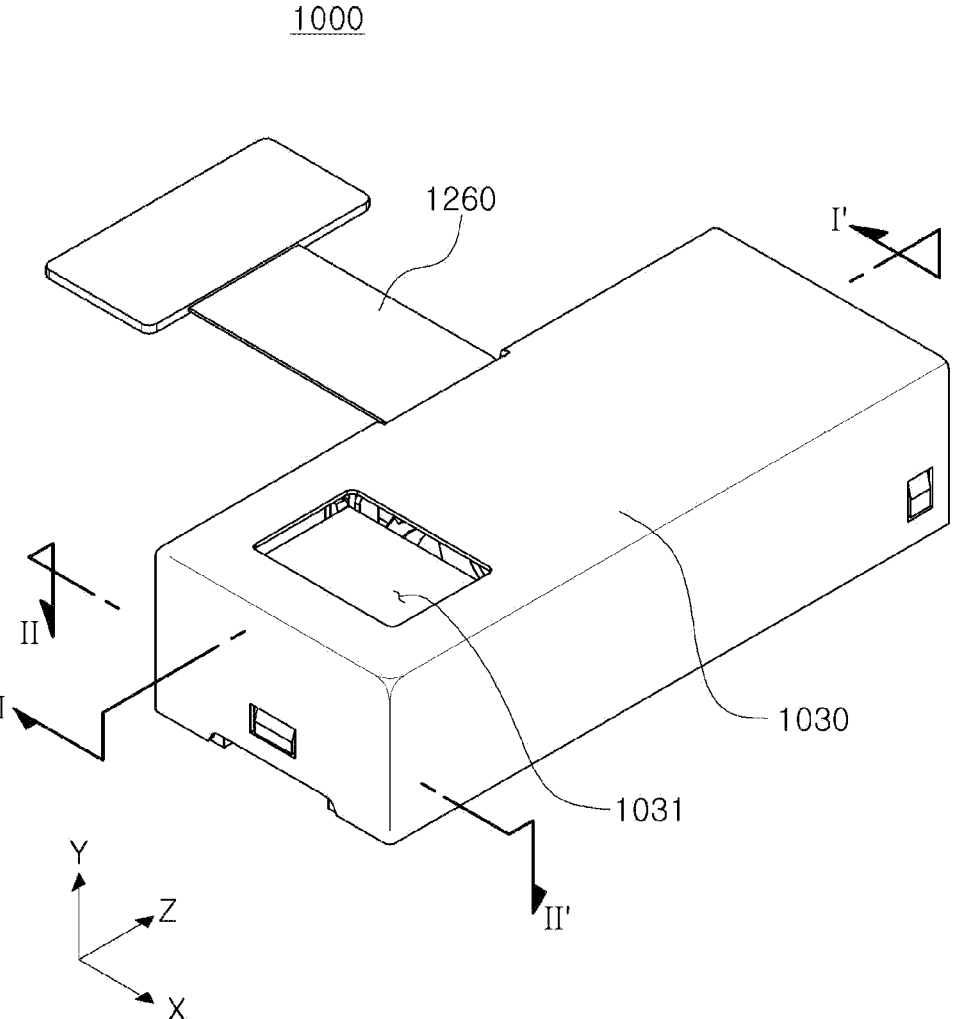
FIG. 2 is a perspective view of a camera module, according to an embodiment.
Figure 3:
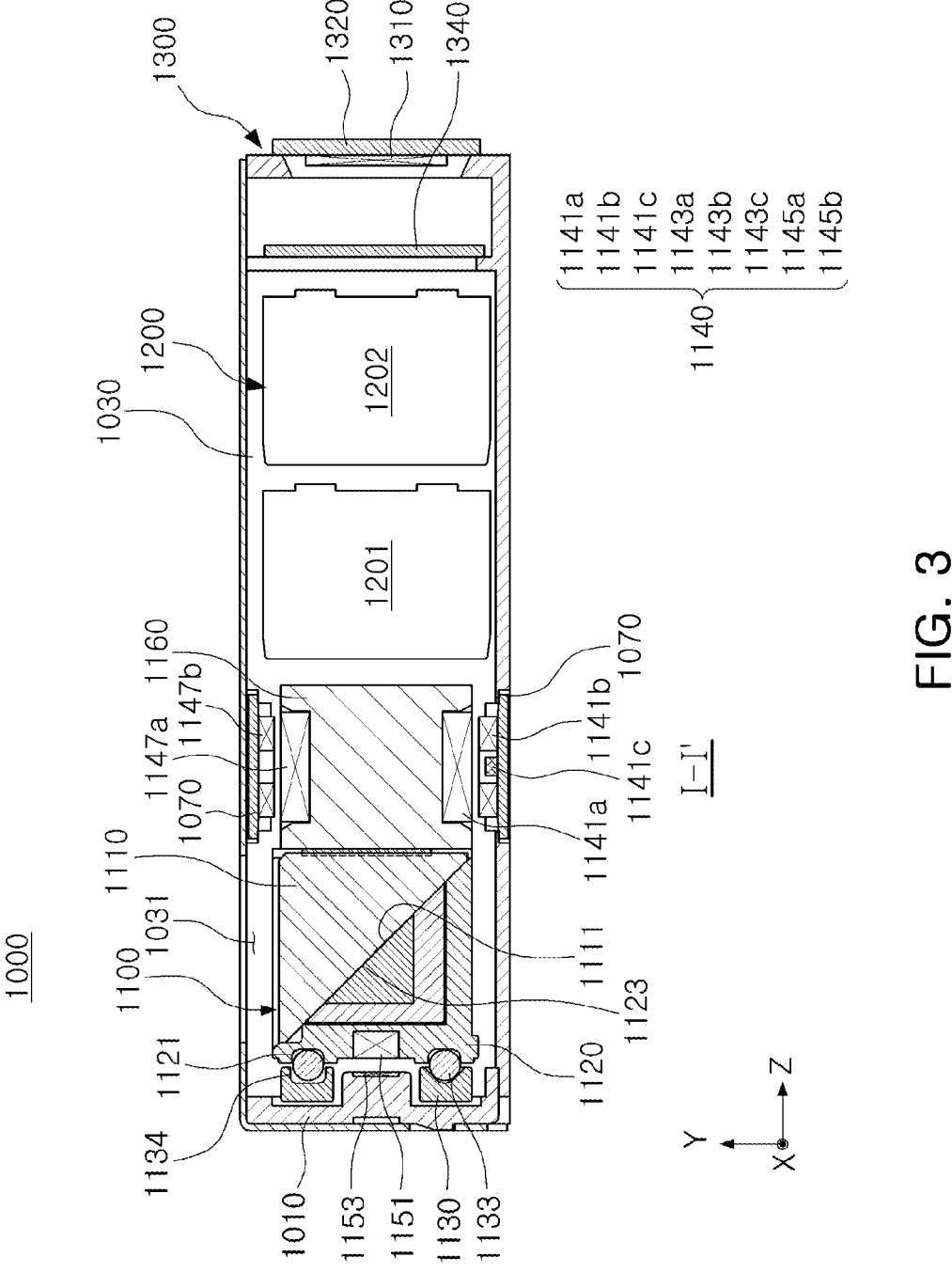
FIG. 3 is a cross-sectional view taken along line I-I' of FIG. 2.
Figure 4:
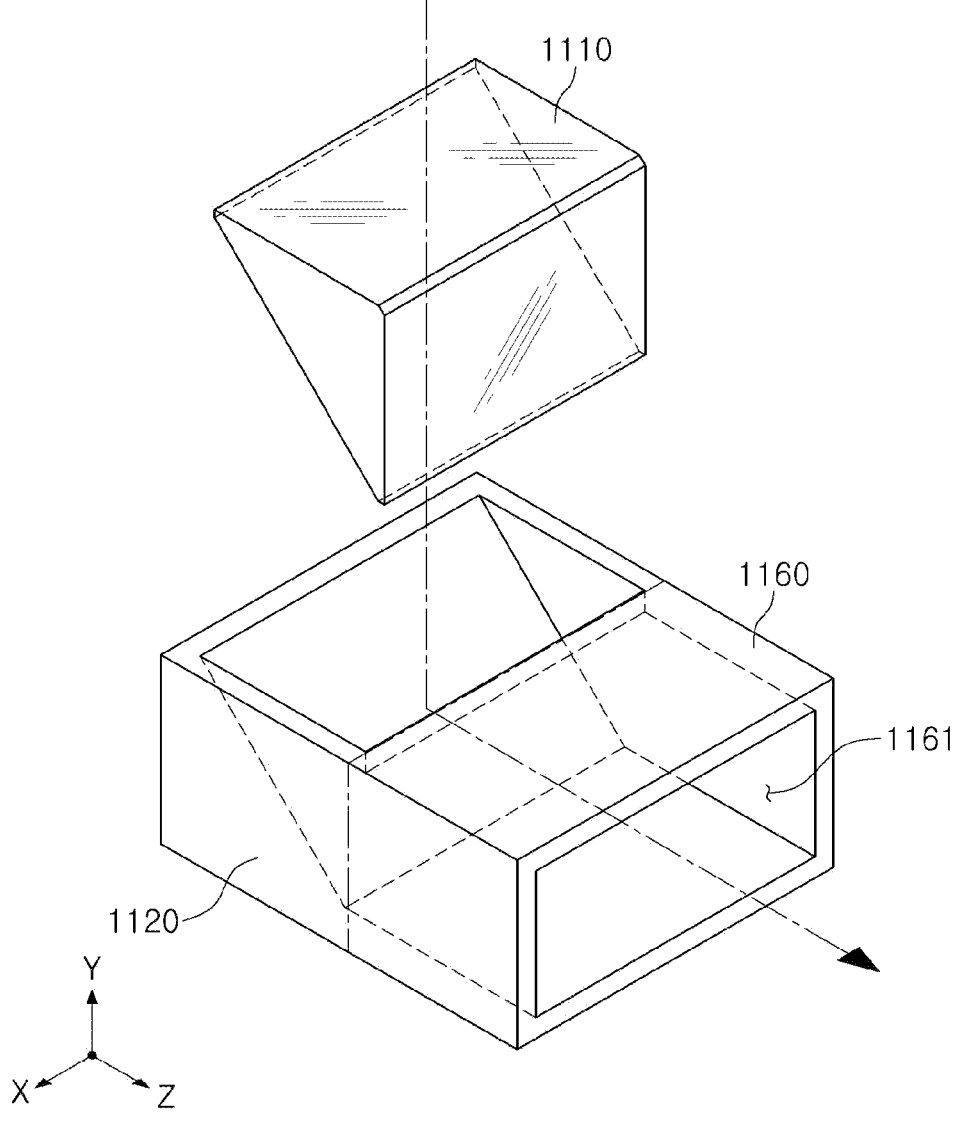
FIG. 4 is a cross-sectional view II-II' of FIG. 2.
Figure 5:
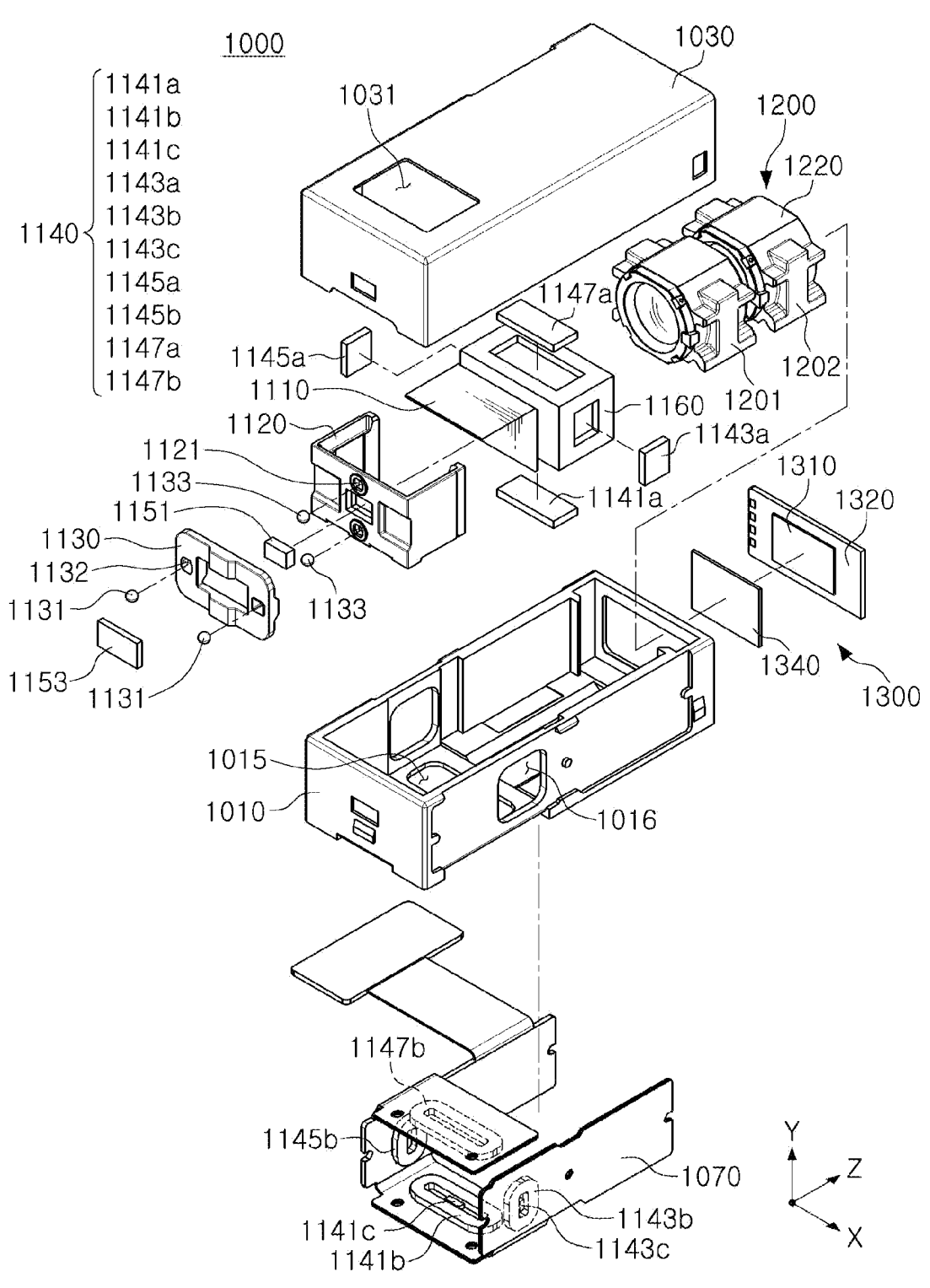
FIG. 5 is an exploded perspective view of the camera module of FIG. 2, according to an embodiment.
Figure 6:
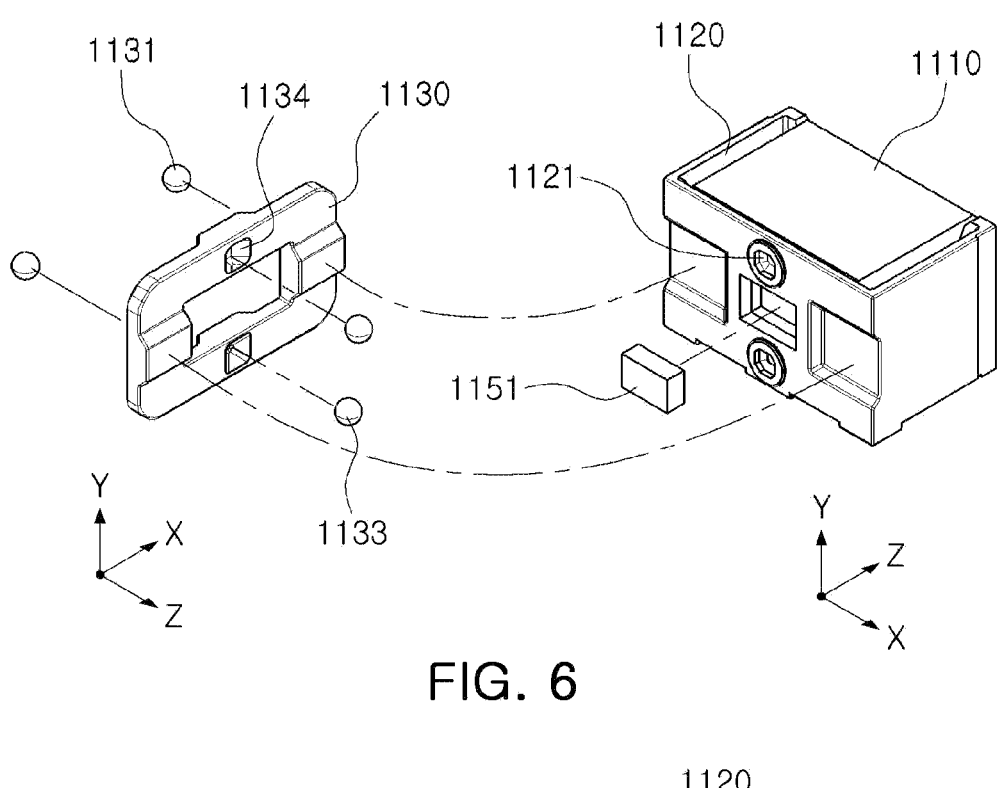
FIG. 6 is an exploded perspective view of a rotating holder and a rotating plate, according to an embodiment.
Figure 7:
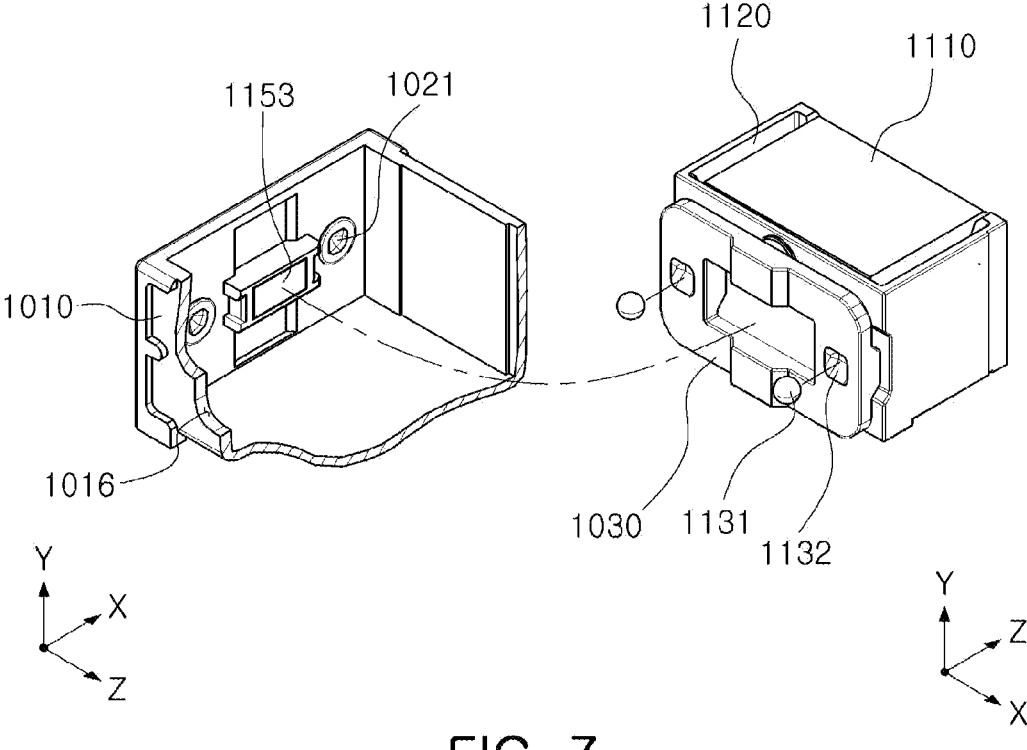
FIG. 7 is an exploded perspective view of the rotating holder and a housing, according to an embodiment.

FIG. 2 is a perspective view of the camera module 1000, according to an embodiment. FIG. 3 is a cross-sectional view taken along line I-I' of FIG. 2. FIG. 4 is a cross-sectional view taken along line II-II' of FIG. 2. FIG. 5 is an exploded perspective view of the camera module 1000, according to an embodiment. FIG. 6 is an exploded perspective view of a rotating holder and a rotating plate, according to an embodiment. FIG. 7 is an exploded perspective view of the rotating holder and a housing, according to an embodiment.

The camera module 1000 includes, for example, a reflective module 1100, a lens module 1200, and an image sensor module 1300 disposed in a housing 1010.

The reflective module 1100, the lens module 1200, and the image sensor module 1300 are sequentially arranged in the housing 1010, from one side of the housing 1010 to another side of the housing 1010. The housing 1010 may have an internal space accommodating the reflective module 1100, the lens module 1200, and the image sensor module 1300 therein. For example, a printed circuit board (PCB) 1320 including the image sensor module 1300 may be attached to the outside of the housing 1010. For example, as shown, the housing 1010 may be integrally formed so that both the reflective module 1100 and the lens module 1200 are accommodated in the internal space of the housing 1010. However, this disclosure is not limited to the aforementioned configuration of the housing 1010, and, for example, separate housings respectively including the reflective module 1100 and the lens module 1200 may be interconnected.

The housing 1010 is covered by a cover 1030 so that the internal space of the housing 1010 is not visible. The cover 1030 has an opening 1031 through which light is incident, and a direction of travel of the light incident through the opening 1031 is changed by the reflective module 1100 such that the light incident through the opening 1031 is incident on the lens module 1200. The cover 1030 may be formed integrally to cover the entirety of the housing 1010 or may be provided as separate members respectively covering the reflective module 1100 and the lens module 1200.

The reflective module 1100 includes a reflective member 1110 configured to reflect light. The light incident on the lens module 1200 passes through the lenses, and is then converted into an electrical signal by the image sensor 1310 and stored.

Referring to FIGS. 6 and 7, the reflective module 1100 is a structure in a rotating holder 1120, and is in close contact with and supported by an inner wall surface of the housing 1010 by attraction between a first magnetic member 1153 disposed on an inner wall surface of the housing 1010 and a second magnetic member 1151 disposed in the rotating holder 1120. The first magnetic member 1153 and the second magnetic member 1151 are configured to generate a magnetic attraction with each other. For example, the first magnetic member 1153 may be a yoke, and the second magnetic member 1151 may be a magnet. As another example, the first magnetic member 1153 may be a magnet and the second magnetic member 1151 may be a magnet or a yoke. By the magnetic attraction between the first magnetic member 1153 and the second magnetic member 1151, the rotating holder may be pulled in a direction parallel to or substantially parallel to the optical axis toward one side of the housing 1010, and ball members 1131 and 1133 disposed between the rotating holder 1120 and the housing 1010 may support the rotating holder 1120 in a direction parallel to the optical axis.

The reflective module 1100 is configured to change a direction of travel of light. For example, the direction of travel of the light incident through the opening 1031 (refer to FIG. 3) of the cover 1030 covering an upper portion of the camera module 1000 may be changed toward the lens module 1200 through the reflective module 1100. To this end, the reflective module 1100 may include the reflective member 1110 to reflect light. The reflective member 1110 may change the direction of travel of the light incident through the opening 1031. For example, the reflective member 1110 may be a mirror or a prism configured to reflect light (for convenience of explanation, the reflective member 1110 is illustrated as a prism in the drawings). A path of the light incident through the opening 1031 is changed toward the lens module 1200 by the reflective module 1100. For example, the path of the light, which is incident in the thickness direction (the Y-axis direction) of the camera module 1000, may be changed to approximately coincide with the optical axis (the Z-axis) direction by the reflective module 1100.

The lens module 1200 includes a plurality of lenses through which the light having its direction of travel changed by the reflective module 1100 passes, and the image sensor module 1300 includes the image sensor 1310 configured to convert the light passing through the plurality of lenses into an electrical signal, and a printed circuit board (PCB) 1320 on which the image sensor 1310 is mounted. In addition, the image sensor module 1300 may include an optical filter 1340 that filters the light incident from the lens module 1200. The optical filter 1340 may be an infrared cut-off filter, for example.

In the internal space of the housing 1010, the reflective module 1100 is disposed in front of the lens module 1200 and the image sensor module 1300 is behind the lens module 1200, with respect to the direction in which the light passes through the lens module 1200.

In an embodiment, the lens module 1200 may include two or more lens modules. For example, the lens module 1200 may include a first lens module 1201 and a second lens module 1202. The first lens module 1201 and the second lens module 1202 are spaced apart from each other in a direction parallel to the optical axis. In an embodiment, the camera module 1000 may include an actuator configured to move each of the first lens module 1201 and the second lens module 1202 in a direction parallel to the optical axis. In this case, the first lens module 1201 and the second lens module 1202 may be independently controlled. For example, a distance between the first and second lens modules 1201 and 1202, in the direction parallel to the optical axis, may be increased or decreased. For example, although not shown, a magnet for shake compensation may be fixed to each of the lens modules 1201 and 1202, and a coil opposing the magnet may be provided in the housing 1010 (or a main substrate 1070).

When an image or video is captured, the image may be blurred or the video may be shaken due to a user's shake, etc. In this case, the camera module 1000 may compensate for the user's shake (or the shake or the like of the electronic device (e.g., the electronic device 1 of FIG. 1 or an electronic device 2 of FIG. 14)) by moving the reflective member 1110. For example, when shaking occurs during image capturing or video shooting due to user shake, the shaking may be compensated for by applying a relative displacement corresponding to the shaking to the reflective member 1110.

As illustrated in FIGS. 3 and 5, in an embodiment, the camera module 1000 may include a shake compensation actuator 1140 configured to move the reflective member 1110. The shake compensation actuator 1140 may include a voice coil motor. For example, the shake compensation actuator 1140 may include a plurality of magnets 1141*a*, 1143*a*, 1145*a*, and 1147*a* configured to move together with the reflective member 1110 and a plurality of opposing coils 1141*b*, 1143*b*, 1145*b*, and 1147*b* facing the plurality of magnets 1141*a*, 1143*a*, 1145*a*, and 1147*a*, respectively.

Referring to FIG. 5, since the plurality of coils 1141*b*, 1143*b*, 1145*b*, and 1147*b* are disposed in the housing 1010 in a state of being mounted on the main substrate 1070, a plurality of through-holes 1015 and 1016 may be formed in the housing 1010 so that the plurality of coils 1141*b*, 1143*b*, 1145*b*, and 1147*b* may be exposed to the internal space of the housing 1010.

The shake compensation actuator 1140 may be configured to enable the reflective member 1110 to be tilted with respect to (e.g., tilted about or tilted around) an axis perpendicular to the optical axis of the lens module 1200. For example, when the optical axis of the lens module 1200 is parallel to the Z-axis, the shake compensation actuator 1140 may be configured to rotate the reflective member 1110 in a predetermined range with respect to the X-axis and/or the Y-axis.

When power is applied to some or all of the plurality of coils 1141*b*, 1143*b*, 1145*b*, and 1147*b*, the reflective member 1110 in which the magnets 1141*a*, 1143*a*, 1145*a*, and 1147*a* are fixedly provided may be rotated with respect a first axis (the X-axis) and a second axis (the Y-axis) by an electromagnetic influence between the magnets 1141*a*, 1143*a*, 1145*a*, and 1147*a* and the coils 1141*b*, 1143*b*, 1145*b*, and 1147*b*, respectively.

Referring to FIG. 3, in an embodiment, the reflective member 1110 may include a reflective surface 1111 parallel to the X-axis, and light incident on one side of the reflective member 1110 may be reflected toward the optical axis by the reflective surface 1111. In this case, the shake compensation actuator 1140 may rotate the reflective member 1110 with respect to an axis parallel to the reflective surface 1111 of the reflective member 1110. In the illustrated embodiment, the reflective surface 1111 of the reflective member 1110 may be a plane parallel to the X-axis, and the shake compensation actuator 1140 may rotate the reflective member 1110 with respect to the X-axis.

Referring to FIGS. 3 to 5, in an embodiment, the entire reflective module 1100 may be configured to move together with the reflective member 1110, and may include an extension member 1160 extending toward the lens module 1200. The extension member 1160 may be disposed between the reflective member 1110 and the lens module 1200, may be configured to rotate together with the reflective member 1110, and may be provided not to interfere with light entering the lens module 1200, after being reflected from the reflective member 1110. For example, the extension member 1160 may be formed of a transparent material (e.g., transparent plastic, glass, etc.). As another example, the extension member 1160 may include a through-portion configured to allow light to pass therethrough.

In an embodiment, the shake compensation actuator 1140 may be provided in the extension member 1160. In an embodiment, the magnets 1141*a*, 1143*a*, 1145*a*, and 1147*a* for shake compensation may be attached to portions of the extension member 1160 except for a portion through which the light passing through the reflection member 1110 passes. For example, the magnets 1141*a*, 1143*a*, 1145*a*, and 1147*a* for shake compensation may be disposed in portions of the extension member 1160 that face in a direction perpendicular to the optical axis.

In an embodiment, the shake compensation actuator 1140 may include a pair of magnets fixedly disposed in the extension member 1160 and facing each other in one direction (e.g., the X direction or the Y direction) perpendicular to the optical axis, and a pair of coils fixedly disposed in the housing and facing the pair of magnets.

Referring to FIGS. 3 to 5, in an embodiment, the shake compensation actuator 1140 may be configured for driving in two directions perpendicular to the optical axis. In an embodiment, the magnets 1141*a* and 1147*a* of the shake compensation actuator 1140 may be configured as a first pair of magnets fixedly disposed in the extension member 1160 and facing each other in a first direction (e.g., the Y direction) perpendicular to the optical axis, and the coils 1141*b* and 1147*b* of the shake compensation actuator 1140 may be configured as a first pair of coils 1141*b* and 1147*b* fixedly disposed in the housing 1010 and facing the first pair of magnets 1141*a* and 1147*a*. In addition, the magnets 1143*a* and 1145*a* of the shake compensation actuator 1140 may be configured as a second pair of magnets fixedly disposed in the extension member 1160 and facing each other in a second direction (e.g., the X direction) perpendicular to both the optical axis and the first direction, and the coils 1143*b* and 1145*b* of the shake compensation actuator 1140 may be configured as a second pair of coils 1143*b* and 1145*b* fixedly disposed in the housing 1010 and facing the second pair of magnets 1143*a* and 1145*a*.

In an embodiment, the camera module 1000 may include a reflective assembly reflecting light incident in the first direction (e.g., −Y direction) toward the lens module 1200. In an embodiment, the reflective assembly may include the reflective member 1110, and a structure fixedly coupled to the reflective member 1110 and allowing the shake compensation actuator 1140 to be mounted therein. For example, the reflective assembly may include the extension member 1160 to which the magnets 1141*a*, 1143*a*, 1145*a*, and 1147*a* for shake compensation may be mounted.

The coils 1141*b*, 1143*b*, 1145*b*, and 1147*b* are mounted in the housing 1010. For example, the coils 1141*b*, 1143*b*, 1145*b*, and 1147*b* may be mounted in the housing 1010 by the medium of the main substrate 1070. That is, for example, the coils 1141*b*, 1143*b*, 1145*b*, and 1147*b* are provided on the main substrate 1070, and the main substrate 1070 is mounted on the housing 1010.

In an embodiment, the main substrate 1070 may be provided to surround at least a portion of the extension member 1160. The main substrate 1070 may surround the extension member 1160 to face the magnets 1141*a*, 1143*a*, 1145*a*, and 1147*a* mounted on the extension member 1160, and the coils 1141*b*, 1143*b*, 1145*b*, and 1147*b* respectively facing the magnets 1141*a*, 1143*a*, 1145*a*, and 1147*a* may be attached to the main substrate 1070. Referring to FIG. 5, a portion of the main substrate 1070 may be bent in a rectangular frame shape to face the magnets 1141*a*, 1143*a*, 1145*a*, and 1147*a* provided in the extension member 1160. The magnets 1141*a*, 1143*a*, 1145*a*, and 1147*a* may be referred to as a first magnet, a second magnet, a third magnet, and a fourth magnet, respectively, and the coils 1141*b*, 1143*b*, 1145*b*, and 1147*b* may be referred to as a first coil, a second coil, a third coil, and a fourth coil, respectively The first coil 1141*b* and the second coil 1147*b* are respectively disposed in a lower portion 1077 and an upper portion 1071 of the main substrate 1070 and face the first magnet 1141*a* and the second magnet 1147*a*, respectively. The third coil 1143*b* and the fourth coil 1145*b* are respectively disposed on both sides 1073 and 1075 of the main substrate 1070 and face the third magnet 1143*a* and the fourth magnet 1145*a*, respectively.

Referring to FIGS. 3 to 5, the reflective member 1110 is fixed to the rotating holder 1120. The rotating holder 1120 includes a mounting surface 1123 on which the reflective member 1110 is mounted. The mounting surface 1123 of the rotating holder 1120 may be configured as an inclined surface so that a path of the light is changed. For example, the mounting surface 1123 may be an inclined surface inclined by 30 to 60 degrees with respect to the optical axis (the Z-axis) of the lenses. In addition, the inclined surface of the rotating holder 1120 may face the opening 1031 of the cover 1030 through which light is incident.

The rotating holder 1120 is movably accommodated in the internal space of the housing 1010. For example, the rotating holder 1120 may be accommodated to be rotatable with respect to the first axis (the X-axis) and the second axis (the Y-axis) in the housing 1010. The first axis (the X-axis) and the second axis (the Y-axis) may be axes perpendicular to the optical axis (the Z-axis), and the first axis (the X-axis) and the second axis (the Y-axis) may be perpendicular to each other.

Referring to FIGS. 5 to 7, in an embodiment, the camera module 1000 may further include the ball members 1131 and 1133 disposed between the reflective member 1110 and the housing 1010. For example, the ball members 1131 and 1133 may be disposed between the housing 1010 and the rotating holder 1120, and the reflective member 1110 may rotate as the rotating holder 1120 rotates based on the ball members 1131 and 1133. In an embodiment, magnetic attraction works between the rotating holder 1120 and the housing 1010 by the first magnetic member 1153 and the second magnetic member 1151, and thus, the rotating holder 1120 may rotate in a state of being supported by the ball members 1131 and 1133 in a direction parallel to the optical axis.

The rotating holder 1120 is supported in the housing 1010 by the first ball members 1131, which are aligned along the first axis (the X-axis), and the second ball members 1133, which are aligned along the second axis (the Y-axis), so that the rotational movement is smooth with respect to the first axis (the X-axis) and the second axis (the Y-axis). In the drawings, as an example, two first ball members 1131 aligned along the first axis (the X-axis) and two second ball members 1133 aligned along the second axis (the Y-axis) are disclosed. In addition, the rotating holder 1120 may rotate with respect to the first axis (the X-axis) and the second axis (the Y-axis) by the shake compensation actuator 1140.

In addition, the first ball members 1131 and the second ball members 1133 may be disposed on front and rear surfaces of the rotating plate 1130, respectively. In another embodiment, the positions of the first ball members 1131 and the second ball members 1133 on the rear surface and the front surface of the rotating plate 1130 may be reversed with respect to the illustrated embodiment. That is, the first ball members 1131 may be aligned along the second axis (the Y-axis), and the second ball members 1133 may be aligned along the first axis (the X-axis). Hereinafter, for convenience of description, the structure shown in the drawings will be described.

The rotating plate 1130 may be disposed between the rotating holder 1120 and an inner surface of the housing 1010. The rotating plate 1120 may be supported in the housing 1010 by attraction between the second magnetic member 1151 and the first magnetic member 1153 by the medium of the rotating plate 1130. The second ball member 1133, by being disposed between the rotating plate 1130 and the rotating holder 1120, supports the rotating holder 1120 in a direction parallel to the optical axis (i.e., the Z direction) The first ball member 1131, by being disposed between the housing 1010 and the rotating plate 1130, supports the rotating plate 1130 and the rotating holder 1120 in a direction parallel to the optical axis.

The front and rear surfaces of the rotating plate 1130 may have first and second seating recesses 1132 and 1134, respectively, so that the first ball member 1131 and the second ball member 1133 are inserted in the first and second seating recesses 1132 and 1134, respectively. The first ball member 1131 is partially inserted in the first seating recess 1132, and the second ball member 1133 may be partially inserted in the second seating recess 1134.

In addition, the housing 1010 may have a third seating recess 1021 in which the first ball member 1131 is partially inserted, and the rotating holder 1120 may have a fourth seating recess 1121 in which the second ball member 1133 is partially inserted.

The first seating recess 1132, the second seating recess 1134, the third seating recess 1021, and the fourth seating recess 1121 described above may be provided in the form of a hemisphere or polygon (polygonal pole or polygonal pyramid) to facilitate rotation of the first ball member 1131 and the second ball member 1133. For ease of rotation of the first ball member 1131 and the second ball member 1133, a depth of the first to fourth recesses 1132, 1134, 1021, and 1121 may be smaller than a radius thereof. The first ball member 1131 and the second ball member 1133 are not entirely inserted into the first to fourth recesses 1132, 1134, 1021, and 1121, but are partially exposed to facilitate rotation of the rotating plate 1130 and the rotating holder 1120. In addition, the first seating recess 1132, the second seating recess 1134, the third seating recess 1021, and the fourth seating recess 1121 may be provided in positions and a number corresponding to positions and numbers of the respective first ball members 1131 and second ball members 1133.

The first ball members 1131 may roll or slide in the first seating recess 1132 and the third seating recess 1021, and the second ball members 1133 may roll or slide in the second seating recess 1134 and the fourth seating recess 1121.

The first ball member 1131 and the second ball member 1133 may have a structure fixed to at least one of the housing 1010, the rotating plate 1130, and the rotating holder 1120. For example, the first ball member 1131 may be fixedly disposed in the housing 1010 or the rotating plate 1130, and the second ball member 1133 may be fixedly disposed in the rotating plate 1130 or the rotating holder 1120. In this case, a seating recess may be provided only in a member opposing a member in which the first ball member 1131 or the second ball member 1133 is fixedly disposed. In this case, the ball members 1131 and 1133 may support rotation of the rotating holder by sliding in the seating recess.

When the first ball member 1131 and the second ball member 1133 are fixed to any one of the housing 1010, the rotating plate 1130, and the rotating holder 1120, the first ball member 1131 and the second ball member 1133 may have a spherical or hemispherical shape (the hemispherical shape is merely an example, and the first ball member 1131 and the second ball member 1133 may be provided to have a protrusion length larger or smaller than the hemisphere).

The first ball member 1131 and the second ball member 1133 may be separately manufactured and attached to any one of the housing 1010, the rotating plate 1130, and the rotating holder 1120. Alternatively, the first ball member 1131 and the second ball member 1133 may be integrally formed when the housing 1010, the rotating plate 1130, and the rotating holder 1120 are manufactured.

A reinforcing plate (not shown) may be mounted in a lower portion of the main substrate 1070 for strength reinforcement.

A closed-loop control method of detecting and feeding back a position of the rotating holder 1120 may be used to rotate the rotating holder 1120. Accordingly, as illustrated in FIG. 5, position sensors 1141c and 1143c are included for closed-loop control. The position sensors 1141c and 1143c may be Hall sensors. The position sensors 1141c and 1143c may be disposed inside or outside each of the coils 1141b and 1143b, and the position sensors 1141c and 1143c may be mounted on the main substrate 1070 on which the coils 1141b and 1143b are mounted.

The main substrate 1070 may include a gyro sensor (not shown) configured to detect a shake factor, such as a user's shake, and a drive circuit element (or a driving unit integrated circuit (IC)) configured to provide a drive signal to the plurality of coils 1141b, 1143b, and 1145b.

As described above, light of which a path has been changed by the reflective module 1100 is incident on the lens module 1200. Therefore, the plurality of stacked lenses provided in the lens module 1200 are aligned in the optical axis direction along the Z-axis, which is a direction in which light exits (or is emitted) from the reflective module 1100. In addition, the lens module 1200 includes a second driving unit configured to implement autofocusing (AF) and zoom functions. In addition, since the lens module 1200 does not include any other components for shake compensation to implement the AF and zoom functions, the lens module, which is relatively light, is moved in the optical axis direction, thereby minimizing power consumption.

Figures 8, 9:
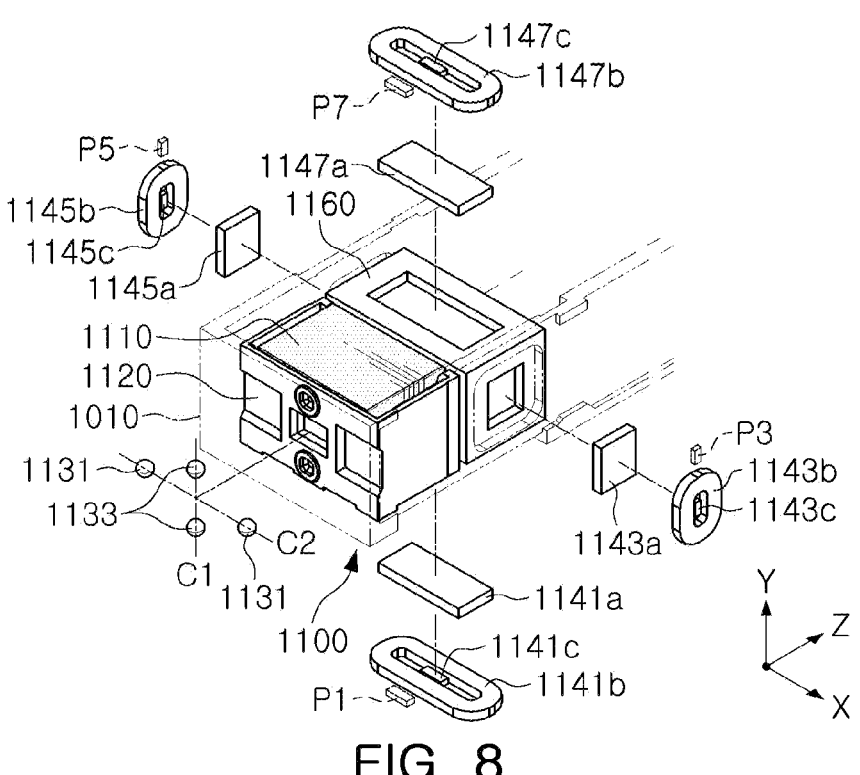
FIG. 8 illustrates a shake compensation actuator, according to an embodiment.
FIG. 9 illustrates a shake compensation actuator, according an embodiment.

FIG. 8 illustrates the shake compensation actuator 1140, according to an embodiment.

Referring to FIG. 8, the shake compensation actuator 1140 may be disposed in the extension member 1160. For example, the first pair of magnets 1141a and 1147a is disposed on upper and lower surfaces of the extension member 1160, and the second pair of magnets 1143a and 1145a is disposed on opposite sides of the extension member 1160. The first pair of magnets 1141a and 1147a and the second pair of magnets 1143*a* and 1145*a* face the first pair of coils 1141*b* and 1147*b* and the second pair of coils 1143*b* and 1145*b*, respectively.

Referring to FIGS. 6 and 7 together, the reflective member 1110 may rotate around the X-axis with respect to the housing 1010, according to an electromagnetic interaction between the first pair of magnets 1141*a* and 1147*a* and the first pair of coils 1141*b* and 1147*b*. Alternatively, the reflective member 1110 may rotate around the axis (i.e., the X-axis) parallel to the reflective surface 1111 of the reflective member 1110, according to the electromagnetic interaction between the first pair of magnets 1141*a* and 1147*a* and the first pair of coils 1141*b* and 1147*b*. The reflective member 1110 may rotate around an axis C2 passing through the first ball members 1131 arranged in the X-axis direction.

The reflective member 1110 may rotate around the Y-axis with respect to the housing 1010, according to an electromagnetic interaction between the second pair of magnets 1143*a* and 1145*a* and the second pair of coils 1143*b* and 1145*b*. Alternatively, the reflective member 1110 may rotate around an axis (e.g., the Y-axis) intersecting the reflective surface 1111 of the reflective member 1110, according to the electromagnetic interaction between the second pair of magnets 1143*a* and 1145*a* and the second pair of coils 1143*b* and 1145*b*. The reflective member 1110 may rotate around an axis C1 passing through the second ball members 1133 arranged in the Y-axis direction.

In an embodiment, the driving unit may include at least one position sensor configured to measure the amount of rotation of the reflective member 1110. In an embodiment, the position sensor may be disposed in a position corresponding to the magnet. For example, the position sensor 1141*c* is a first position sensor, and may be disposed inside the first coil 1141*b*. Referring to FIG. 5, the position sensor may be fixedly disposed in the housing 1010 or the main substrate 1070. For example, the first position sensor 1141*c* may be attached to a lower portion of the main substrate 1070 together with the first coil 1141*b*.

The description that the position sensor is in a position corresponding to the magnet may be understood as including a case in which the position sensor is located within a range of an influence (i.e., magnetic field) of the magnet, as well as a case in which the position sensor and the magnet face each other.

In an embodiment, the driving unit may include a pair of position sensors corresponding to a pair of magnets. By using the pair of position sensors, the amount of rotation of the reflective member 1110 may be measured more accurately.

In an embodiment, the first position sensor 1141*c* and a second position sensor 1147*c* respectively corresponding to the first magnet 1141*a* and the second magnet 1147*a* may be respectively disposed below and above the extension member 1160. For example, the first position sensor 1141*c* and the second position sensor 1147*c* may be disposed inside the first coil 1141*b* and the second coil 1147*b*, respectively.

In an embodiment, the position sensor 1143*c* is a third position sensor, and the third position sensor 1143*c* and a fourth position sensor 1145*c* respectively corresponding to the third magnet 1143*a* and the fourth magnet 1145*a* may be disposed on both sides of the extension member 1160, respectively. For example, the third position sensor 1143*c* and the fourth position sensor 1145*c* may be disposed inside the third coil 1143*b* and the fourth coil 1145*b*, respectively.

In an embodiment, the first to fourth position sensors 1141*c*, 1147*c*, 1143*c*, and 1145*c* may be disposed inside or outside the corresponding first to fourth coils 1141*b*, 1147*b*,

1143*b*, and 1145*b*. In the embodiment shown in FIG. 8, the first to fourth position sensors 1141*c*, 1147*c*, 1143*c*, and 1145*c* are disposed inside the corresponding first to fourth coils 1141*b*, 1147*b*, 1143*b*, and 1145*b*, but in another embodiment, some or all of the first to fourth position sensors may be disposed outside the corresponding coil(s) 1141*b*, 1147*b*, 1143*b*, and 1145*b*. By disposing the position sensor outside the coil, a hall coupling phenomenon may be minimized or prevented.

For example, the first position sensor 1141*c* and the second position sensor 1147*c* may be located at points P1 and P7 in a −Z direction with respect to the first coil 1141*b* and the second coil 1147*b*, respectively. For example, the third position sensor 1143*c* and the fourth position sensor 1145*c* may be located at points P3 and P5 in a +Y direction with respect to the third coil 1143*b* and the fourth coil 1145*b*, respectively. As another example, the first position sensor 1141*c* may be disposed inside the first coil 1141*b*, and the second position sensor 1147*c* may be disposed outside the second coil 1147*b*. As another example, the first position sensor 1141*c* and the second position sensor 1147*c* may be disposed inside the first coil 1141*b* and the second coil 1147*b*, respectively, and the third position sensor 1143*c* and the fourth position sensor 1145*c* may be disposed outside the third coil 1143*b* and the fourth coil 1145*b*, respectively.

FIG. 9 illustrates a shake compensation actuator 1140-1, according to an embodiment.

In FIG. 8, the magnets and the coils are disposed on the side (X direction) of the extension member 1160, as well as above (+Y direction) and below (−Y direction) the extension member 1160, but in the embodiment of FIG. 9, magnets and coils are disposed only on the side of the extension member 1160. The shake compensation actuator 1140-1 of FIG. 9 may replace the shake compensation actuator 1140 of FIG. 5.

Referring to FIG. 9, the shake compensation actuator 1140-1 may be disposed in the extension member 1160. For example, a first pair of magnets, including a first magnet 1142*a* and a second magnet 1148*a*, and a second pair of magnets, including a third magnet 1144*a* and a fourth magnet 1146*a*, are disposed on both sides of the extension member 1160, respectively. The first magnet 1142*a* and the second magnet 1148*a* are disposed on both sides of the extension member 1160, respectively. The third magnet 1144*a* and the fourth magnet 1146*a* are disposed on both sides of the extension member 1160, respectively. In the illustrated embodiment, the first pair of magnets 1142*a* and 1148*a* are disposed farther from the reflective member 1110 than the second pair of magnets 1144*a* and 1146*a*, but in another embodiment, positions of the first pair of magnets 1142*a* and 1148*a* and the second pair of magnets 1144*a* and 1146*a* may be interchanged.

The first pair of magnets 1142*a*, 1148*a* and the second pair of magnets 1144*a* and 1146*a* face a first pair of coils, including a first coil 1142*b* and a second coil 1148*b*, and a second pair of coils, including a third coil 1144*b* and a fourth coil 1146*b*, respectively. That is, the first coil 1142*b*, the second coil 1148*b*, the third coil 1144*b*, and the fourth coil 1146*b* may all be arranged to face the side surfaces (the surfaces facing in the X direction) of the extension member 1160.

Referring to FIGS. 6 and 7 together, the reflective member 1110 may rotate around the X-axis with respect to the housing 1010 according to an electromagnetic interaction between the first pair of magnets 1142*a* and 1148*a* and the first pair of coils 1142*b* and 1148*b*. Alternatively, the reflective member 1110 may rotate around an axis (i.e., the X-axis) parallel to the reflective surface 1111 of the reflective member 1110 according to the electromagnetic interaction between the first pair of magnets 1142a and 1148a and the first pair of coils 1142b and 1148b. The reflective member 1110 may rotate around the axis C2 passing through the first ball members 1131 arranged in the X-axis direction.

The reflective member 1110 may rotate around the Y-axis with respect to the housing 1010 according to an electromagnetic interaction between the second pair of magnets 1144a and 1146a and the second pair of coils 1144b and 1146b. Alternatively, the reflective member 1110 may rotate around an axis (e.g., the Y-axis) intersecting the reflective surface 1111 of the reflective member 1110 according to the electromagnetic interaction between the second pair of magnets 1144a and 1146a and the second pair of coils 1144b and 1146b. The reflective member 1110 may rotate around the axis C1 passing through the second ball members 1133 arranged in the Y-axis direction.

Referring to FIG. 9, in an embodiment, the driving unit may include at least one position sensor configured to measure the amount of rotation of the reflective member 1110. For example, a first position sensor 1142c may be disposed inside the first coil 1142b. Referring to FIG. 5, the position sensor may be fixedly disposed in the housing 1010 or the main substrate 1070. For example, the first position sensor 1142c may be attached to a lower portion of the main substrate 1070 together with the first coil 1142b.

In an embodiment, the driving unit may include a pair of position sensors corresponding to a pair of magnets. The amount of rotation of the reflective member 1110 may be more accurately measured using the two position sensors.

In an embodiment, the first position sensor 1142c and a second position sensor 1148c corresponding to the first pair of magnets 1142a and 1148a may be disposed on both sides of the extension member 1160, respectively. For example, the first position sensor 1142c and the second position sensor 1148c may be disposed inside the first coil 1142b and the second coil 1148b, respectively.

In an embodiment, a third position sensor 1144c and a fourth position sensor 1146c corresponding to the second pair of magnets 1144a and 1146a may be disposed on both sides of the extension member 1160, respectively. For example, the third position sensor 1144c and the fourth position sensor 1146c may be disposed inside the third coil 1144b and the fourth coil 1146c, respectively.

In an embodiment, the position sensor may be disposed inside or outside the corresponding coil. In the embodiment shown in FIG. 9, the first to fourth position sensors 1142c, 1148c, 1144c, and 1146c are disposed inside the corresponding first to fourth coils 1142b, 1148b, 1144b, and 1146b. However, in in another embodiment, some or all of the first to fourth position sensors 1142c, 1148c, 1144c, and 1146c may be disposed outside the corresponding coil(s) 1142b, 1148b, 1144b, and 1146b. By disposing the position sensor outside the coil, a hall coupling phenomenon may be minimized or prevented.

For example, the first position sensor 1142c and the second position sensor 1148c may be located at points P2 and P8 in the +Y direction with respect to the first coil 1142b and the second coil 1148b, respectively. For example, the third position sensor 1144c and the fourth position sensor 1146c may be located at points P4 and P6 in the +Y direction with respect to the third coil 1144b and the fourth coil 1146b, respectively. As another example, the first position sensor 1142c may be disposed inside the first coil 1142b, and the second position sensor 1148c may be disposed outside the second coil 1148b. As another example, the first position sensor 1142c and the second position sensor 1148c may be disposed inside the first and second coils 1142b and 1148b, respectively, and the third position sensor 1144c and the fourth position sensor 1146c may be disposed outside the third and fourth coils 1144b and 1146b, respectively.

Figure 10:
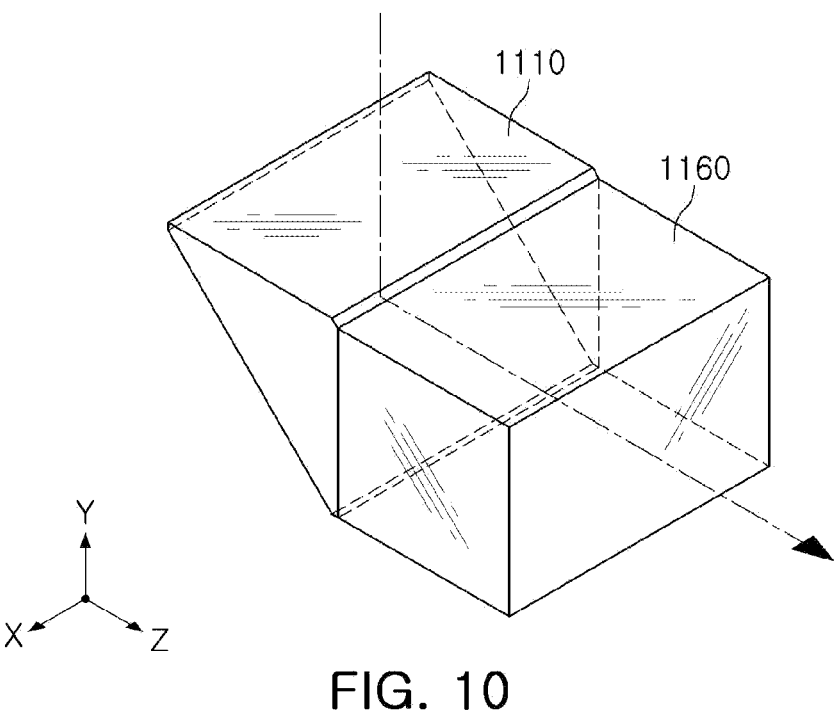
FIG. 10 illustrates an extension member, according to an embodiment.
Figure 11:
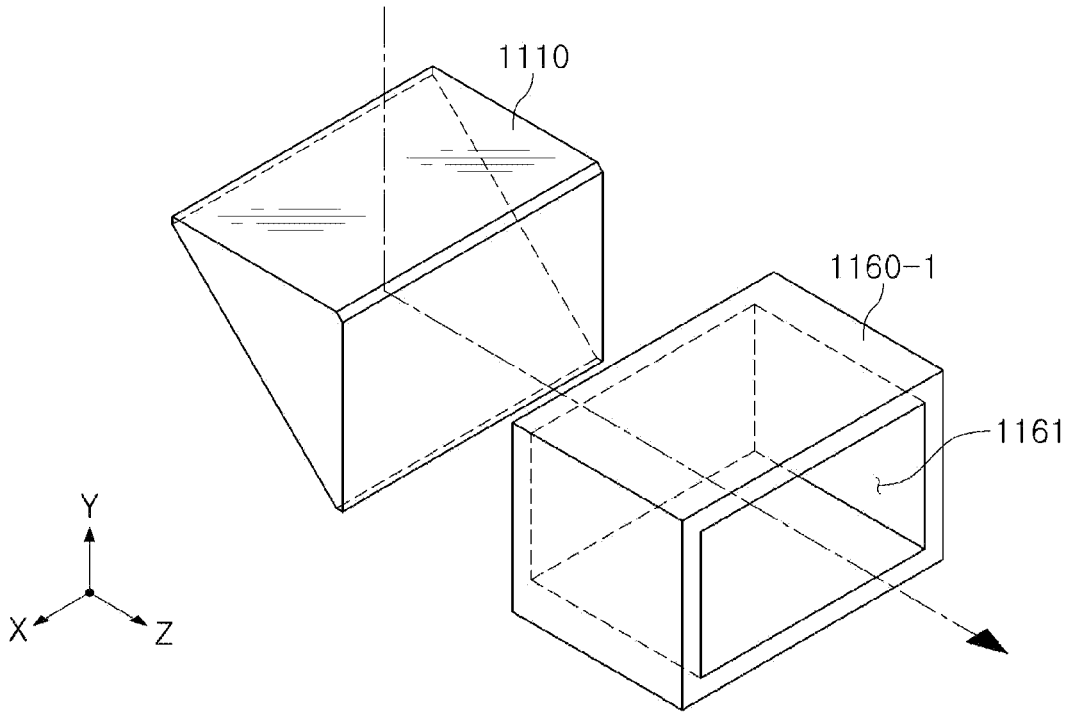
FIG. 11 illustrates an extension member, according to an embodiment.
Figure 12:
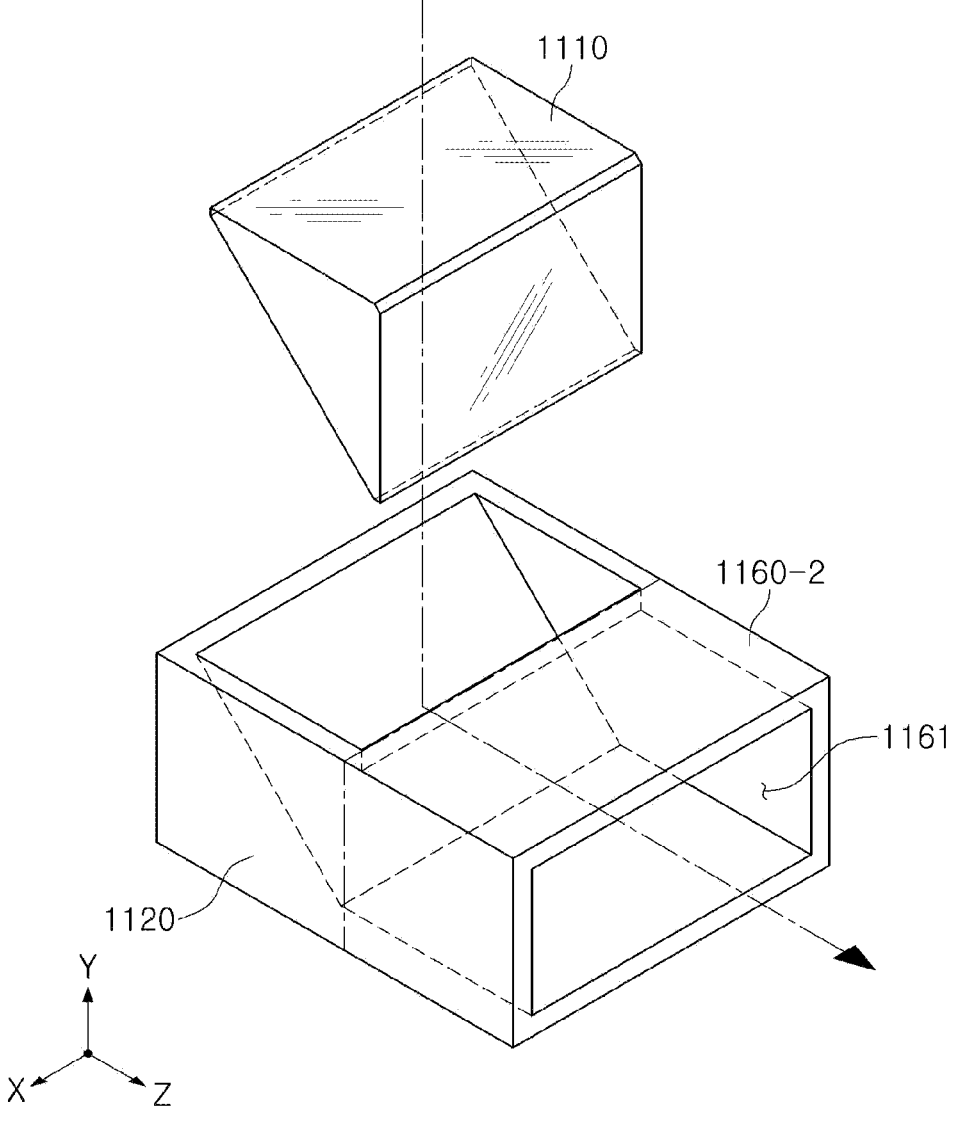
FIG. 12 illustrates an extension member, according to an embodiment.
Figure 13:
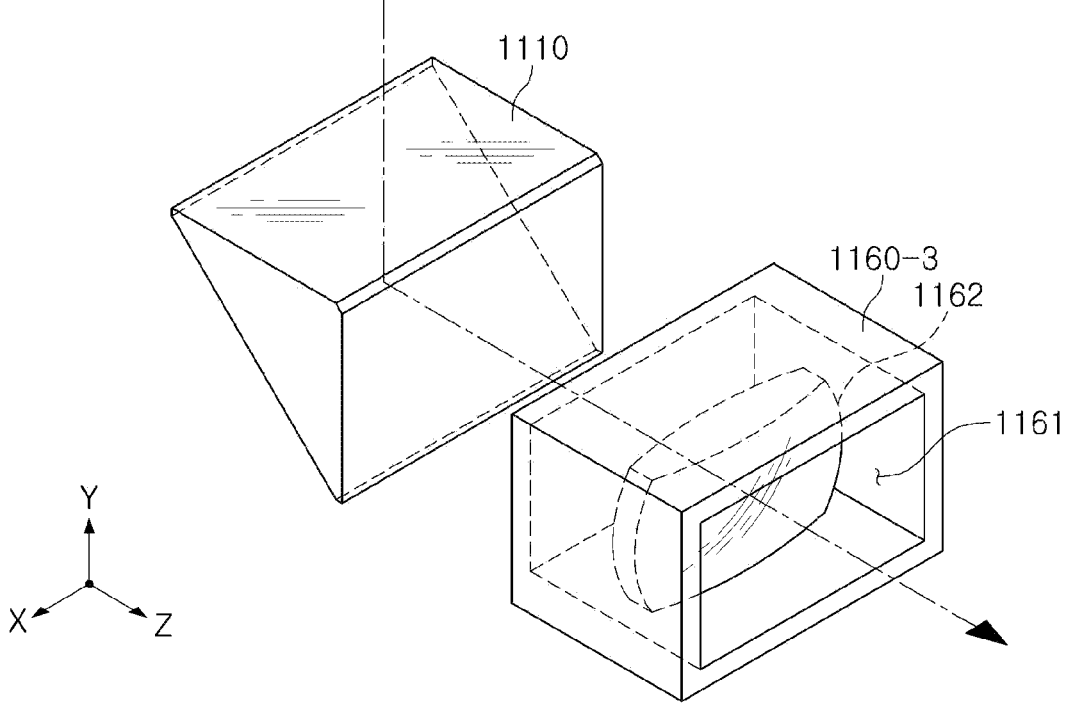
FIG. 13 illustrates an extension member, according to an embodiment.

FIG. 10 illustrates the extension member 1160, according to an embodiment. FIG. 11 illustrates an extension member 1160-1, according to an embodiment. FIG. 12 illustrates an extension member 1160-2, according to an embodiment. FIG. 13 illustrates an extension member 1160-3, according to an embodiment.

Referring to FIG. 10, in an embodiment, the extension member 1160 may be formed of a transparent material to allow light reflected from the reflective member 1110 to pass therethrough. For example, the extension member 1160 may be formed of the same material as the reflective member 1110. For example, the extension member 1160 may be formed of transparent plastic or glass.

Referring to FIG. 11, in an embodiment, the extension member 1160-1 may include a through-portion 1161 through which light reflected from the reflective member 1110 may pass. For example, the extension member 1160-1 may have a rectangular frame shape, and light reflected from the reflective member 1110 may pass through a space surrounded by the rectangular frame. In this case, the extension member 1160-1 may be formed of an opaque material.

Referring to FIG. 12, in an embodiment, the extension member 1160-2 may be integrally formed with the rotating holder 1120 in which the reflective member 1110 is seated. The extension member 1160-2 may be formed to extend from the rotating holder 1120 in the optical axis direction. The extension member 1160-2 may include the through-portion 1161 through which light reflected from the reflective member 1110 may pass.

Referring to FIG. 13, in an embodiment, at least one lens 1162 may be provided inside the extension member 1160-3. The extension member 1160-3 may include the through-portion 1161 through which light passes, and at least one lens 1162 may be disposed inside the through-portion 1161. For example, the at least one lens 1162 may have a D-cut shape in which upper and lower portions of a circular lens are cut in a straight line. In other words, the at least one lens 1162 may include two opposing edges (side edges) having a curved shape, and two opposing edges (upper and lower edges) having a straight line shape.

The magnets 1141a, 1143a, 1145a, and 1147a for shake compensation may be mounted in a portion of the extending member 1160, 1160-1, 160-2, or 1160-3 illustrated in FIGS. 10 through 13 facing in a direction (the Y direction and X direction) perpendicular to the moving direction (the Z direction) of light.

Although not shown, in an embodiment, a lens shape may be additionally provided on one surface of the reflective member 1110. For example, the reflective member 1110 may include a lens surface having a shape similar to that of the lens 1162 and configured to refract reflected light in a portion facing the extension member 1160, 1160-1, 160-2, or 1160-3.

Figure 14:
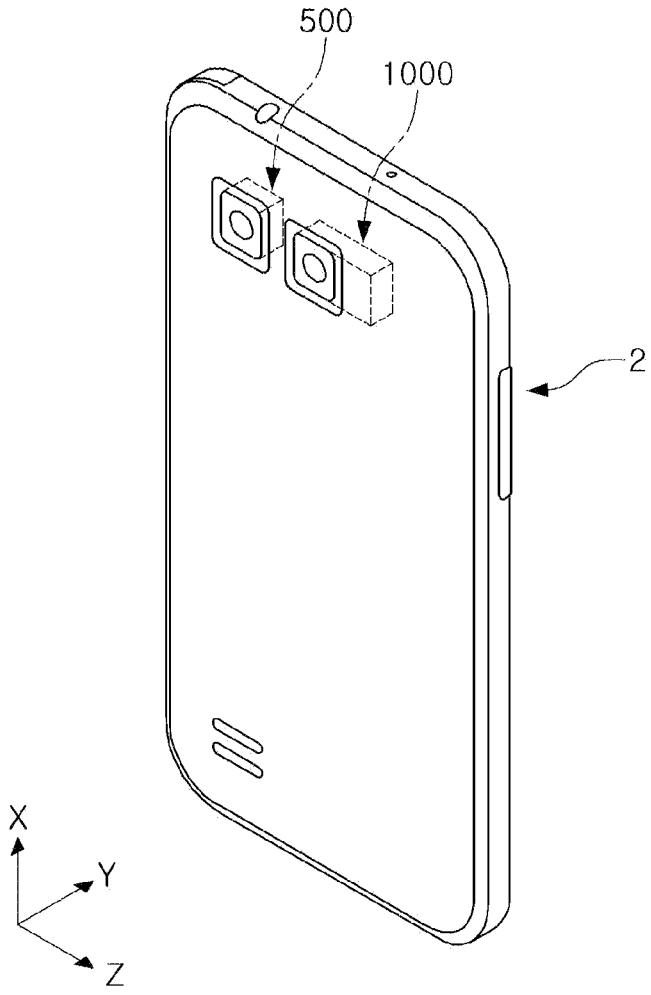
FIG. 14 is a perspective view of a portable electronic device, according to an embodiment.

FIG. 14 is a perspective view of a portable electronic device, according to an embodiment.

Referring to FIG. 14, a portable electronic device 2 may be a portable electronic device, such as a mobile communication terminal, a smartphone, or a tablet PC equipped with a plurality of camera modules 500 and 1000.

The plurality of camera modules 500 and 1000 may be mounted in the portable electronic device 2.

At least one of the plurality of camera modules 500 and 1000 may be the camera module 1000 according to an embodiment described above with reference to FIGS. 2 to 13.

That is, in the case of the portable electronic device 2 having a dual camera module, at least one of two camera modules may be provided as the camera module according the disclosure herein.

Through the embodiments disclosed herein, a camera module and a portable electronic device including the camera module may have a simple structure and a smaller size, while implementing functions such as autofocusing, zoom, and OIS. In addition, power consumption may be minimized.

As set forth above, a camera module disclosed herein may provide excellent shake compensation performance. For example, in a folded camera module that implements shake compensation by tilting a prism, improved performance of shake compensation may be provided by accurately driving the prism.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a first lens module disposed in a housing and including at least one lens;
a reflective member configured to change a path of light toward the first lens module;
a holder accommodating the reflective member;
an extension member configured to be moved together with the reflective member, and disposed between the reflective member and the first lens module; and
a shake compensation actuator disposed in the extension member and configured to tilt the reflective member with respect to an axis perpendicular to an optical axis of the first lens module, the shake compensation actuator comprising a pair of magnets disposed on opposing surfaces of the extension member along one direction perpendicular to the optical axis and another pair of magnets disposed on opposing surfaces of the extension member along another direction perpendicular to both the optical axis and the one direction,
wherein the extension member is disposed between the holder and the first lens module.

2. The camera module of claim 1, wherein the shake compensation actuator includes coils facing the pair of magnets.

3. The camera module of claim 2, wherein the pair of magnets include a first pair of magnets fixedly disposed in the extension member and facing each other in a first direction perpendicular to the optical axis, and
wherein the coils include a first pair of coils fixedly disposed in the housing and facing the first pair of magnets.

4. The camera module of claim 3, wherein the other pair of magnets include a second pair of magnets fixedly disposed in the extension member and facing each other in a second direction perpendicular to both the optical axis and the first direction, and
wherein the coils include a second pair of coils fixedly disposed in the housing and facing the second pair of magnets, respectively.

5. The camera module of claim 3, further comprising:
a pair of position sensors arranged in positions respectively corresponding to magnets configuring the first pair of magnets,
wherein the reflective member includes a reflective surface configured to change a direction of the light, and a tilt axis of the reflective member is parallel to the reflective surface.

6. The camera module of claim 1, wherein the extension member includes a transparent material and allows light reflected from the reflective member to pass through the extension member.

7. The camera module of claim 1, wherein the extension member includes a through portion allowing light reflected from the reflective member to pass through the extension member.

8. The camera module of claim 7,
wherein the extension member extends from the holder toward the first lens module.

9. The camera module of claim 1, further comprising at least one additional lens disposed in the extension member.

10. The camera module of claim 1, further comprising a second lens module spaced apart from the first lens module in a direction of the optical axis.

11. The camera module of claim 10, further comprising an actuator configured to independently move the first lens module and the second lens module in the direction of the optical axis.

12. The camera module of claim 1, further comprising:
a ball member disposed between the reflective member and the housing,
wherein the reflective member is configured to tilt with respect to the axis perpendicular to the optical axis, in a state of being supported by the ball member in the housing in a direction parallel to the optical axis.

13. The camera module of claim 12, further comprising:
a first magnetic member coupled to the reflective member; and
a second magnetic member fixedly disposed in the housing and facing the first magnetic member,
wherein the ball member supports the reflective member in the direction parallel to the optical axis by magnetic attraction generated between the first magnetic member and the second magnetic member.

14. A camera module, comprising:
a lens module disposed in a housing and including at least one lens;
a reflective assembly configured to reflect light, which is incident in a first direction, toward the lens module;
a holder accommodating the reflective member;
an extension member configured to be moved together with the reflective member; and a shake compensation actuator configured to tilt the reflective assembly with respect to an axis perpendicular to both the first direction and an optical axis of the lens module, wherein the shake compensation actuator includes a first pair of magnets fixedly disposed in the reflective assembly and facing each other in the first direction, a second pair of magnets fixedly disposed in the reflective assembly and facing each other in a second direction, different from the first direction, perpendicular to the optical axis, and a pair of coils fixedly disposed in the housing and facing the first pair of magnets, and wherein the extension member is disposed between the holder and the first lens module.

15. The camera module of claim 14, wherein the reflective assembly includes a reflective member configured to reflect the light, and a structure fixedly coupled to the reflective member and having the pair of second magnets mounted in the structure.

16. A shake compensation reflective module, comprising:

a housing;

a reflective member disposed in the housing and allowing incident light to be changed in path and exit the reflective member;

an extension member configured to move together with the reflective member and extending in a direction in which light changed in path exits the reflective member; and a shake compensation actuator disposed in the extension member and enabling the reflective member to be tilted with respect to an axis perpendicular to the direction in which the light exits the reflective member, the shake compensation actuator comprising a pair of magnets disposed on opposing surfaces of the extension member along one direction perpendicular to the optical axis and another pair of magnets disposed on opposing surfaces of the extension member along another direction perpendicular to both the optical axis and the one direction, wherein the extension member is formed of a transparent material.

17. The shake compensation reflective module of claim 16, wherein the extension member includes an open space through which the light changed in path is allowed to pass after exiting the reflective member.

18. The shake compensation reflective module of claim 17, further comprising at least one additional lens disposed within the open space.

19. The shake compensation reflective module of claim 16, wherein the shake compensation actuator includes a first magnet and a second magnet respectively disposed in sides of the reflective member that are spaced apart from each other in a first direction perpendicular to the direction in which the light changed in path exits the reflective member.

20. The shake compensation reflective module of claim 19, wherein the shake compensation actuator includes a third magnet and a fourth magnet respectively disposed in sides of the reflective member that are spaced apart from each other in a second direction perpendicular to the first direction and the direction in which the light changed in path exits the reflective member.

21. The shake compensation reflective module of claim 19, wherein the incident light is incident to the reflective member in a direction perpendicular to the direction in which the light changed in path exits the reflective member.

22. A portable electronic device, comprising:

a camera module comprising:

a lens module disposed in a housing and including at least one lens;

a reflective member configured to change a path of light incident to the reflective member toward the lens module;

a holder accommodating the reflective member;

an extension member configured to be moved together with the reflective member, and extended from the reflective member; and a shake compensation actuator disposed in the extension member and configured to tilt the reflective member, the shake compensation actuator comprising a pair of magnets disposed on opposing surfaces of the extension member in one direction perpendicular to an optical axis and another pair of magnets disposed on opposing surfaces of the extension member along another direction perpendicular to both the optical axis and the one direction, wherein the extension member is disposed between the holder and the lens module.

23. The portable electronic device of claim 22, wherein the optical axis extends perpendicular to a direction from a front surface of the portable electronic device to a rear surface of the portable electronic device.

24. The portable electronic device of claim 22, wherein the extension member includes an open space through which the light is allowed to pass after passing the reflective member.

25. The portable electronic device of claim 22, wherein the extension member is formed of a transparent material.

26. The portable electronic device of claim 22, wherein the extension member is disposed between the reflective member and the lens module.

27. The portable electronic device of claim 22, wherein the shake compensation actuator is configured to tilt the reflective member with respect to an axis perpendicular to an optical axis of the lens module.

28. The portable electronic device of claim 22, wherein the extension member is extended toward the lens module.

* * * * *